United States Patent

Burke

[15] 3,666,852
[45] May 30, 1972

[54] METHOD FOR MAKING AN ELASTOMERIC ANNULAR SEAL WITH ENCLOSED GARTER SPRING

[72] Inventor: Michael J. Burke, Southfield, Mich.
[73] Assignee: Federal-Mogul Corporation, Southfield, Mich.
[22] Filed: Jan. 6, 1970
[21] Appl. No.: 982

[52] U.S. Cl. ............................ 264/229, 264/266, 264/268, 18/DIG. 47
[51] Int. Cl. .................................... B29d 3/00, B29h 9/08
[58] Field of Search ........... 264/266, 267, 268, 229, DIG. 67; 18/DIG. 47

[56] References Cited

UNITED STATES PATENTS

| 3,246,369 | 4/1966 | Rhoads et al. | 18/DIG. 47 |
|---|---|---|---|
| 3,061,862 | 11/1962 | Minor | 264/229 X |
| 3,415,924 | 12/1968 | Girardi | 264/229 |
| 3,162,456 | 12/1964 | Williams | 18/DIG. 47 |
| 3,490,099 | 1/1970 | Smith et al. | 18/DIG. 47 |
| 3,392,226 | 7/1968 | McKinven, Jr. | 18/DIG. 47 |
| 3,004,298 | 10/1961 | Haynie | 264/DIG. 67 |

Primary Examiner—Robert F. White
Assistant Examiner—Allen M. Sokal
Attorney—Barthel & Bugbee

[57] ABSTRACT

A mold assembly including an externally-tapered lower core member with an annular groove near the top and an annular shoulder and seat near the bottom and an internally-tapered upper cavity mold member cooperatively form an annular die cavity having the shape desired for the elastomeric annular seal to be formed therein. Prior to molding the seal, the upper cavity mold member is retracted and moved out of alignment with the core member and replaced temporarily by a cylindrical loading device having an annular groove for receiving a pre-tensioned annular hollow helical tension spring and below it a cylindrical end portion adapted to receive an annular charge of elastomer. In carrying out the method of this invention, an annular mounting case is placed on the seat and a collar on the loading device is moved downward so as to push the annular hollow helical tension spring and the annular elastomeric charge from the loading device onto the core member until the spring snaps into the annular groove of the latter. The loading device is then retracted and moved out of alignment with the core member and the mold cavity member moved into alignment therewith and then moved downward into telescoping relationship with the core member, moving the annular hollow helical tension spring downward and at the same time expanding and circumferentially stretching it to open up spaces between its convolutions.

As the spring is pushed downward, it pushes the elastomeric charge ahead of it into the mold chamber which shapes the seal and totally encloses the spring therein. Excess elastomer is ejected upward through the clearance between the mold and core members. Simultaneously therewith, the elastomer is pushed between the now-spaced convolutions of the expanded spring into the hollow of the spring, completely and uniformly filling it with elastomer. The upper mold cavity is then moved downward to the end of its stroke and an annular nose portion thereof cooperates with the shoulder as a fulcrum to bend the periphery of the case upward into a frusto-conical flange which enters the mold chamber and becomes bonded to elastomer flowing against its opposite sides. The end of the stroke ordinarily cuts off any flash adhering to the upper end of the seal, forming a sharp sealing lip thereon. The elastomer of the seal is then cured in the mold cavity by heating the mold assembly, after which the completed seal is ejected from the core member by a conventional stripper as the mold cavity member is retracted upward.

1 Claim, 10 Drawing Figures

Patented May 30, 1972
3,666,852
3 Sheets-Sheet 1
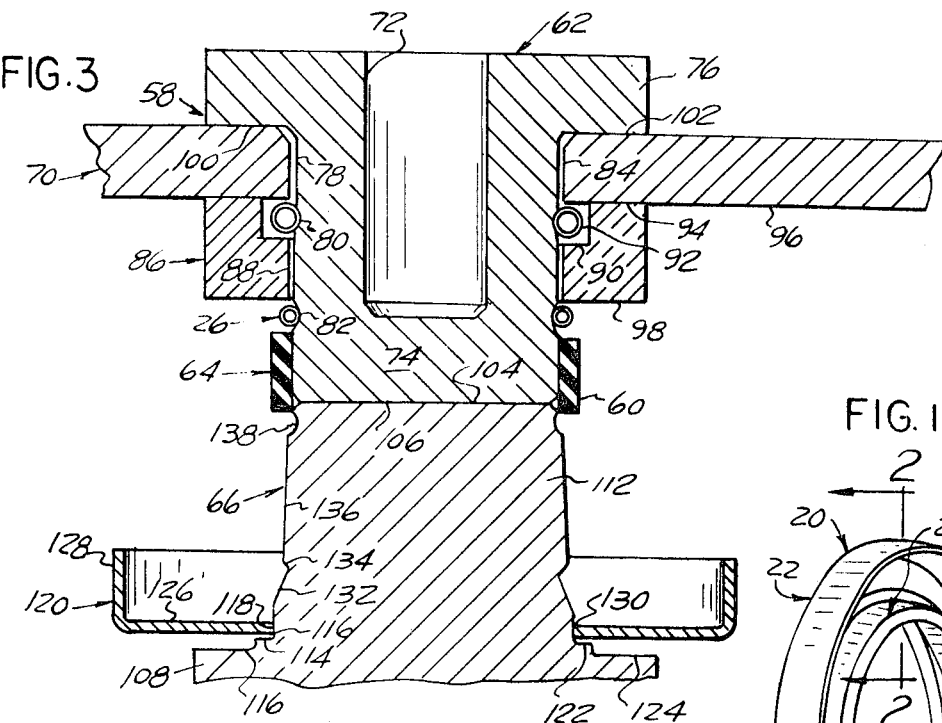
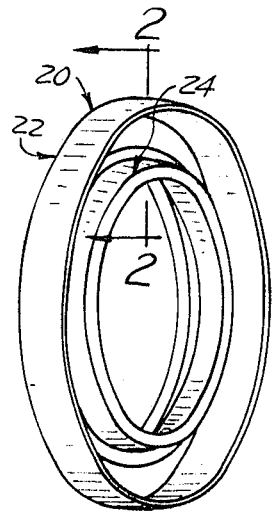
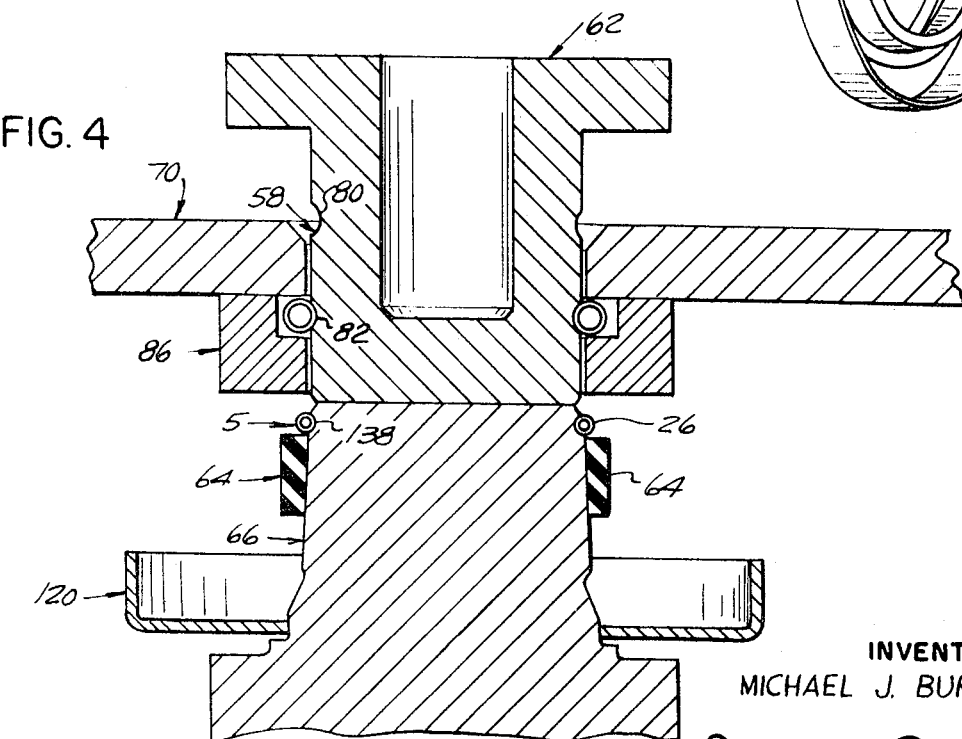
INVENTOR
MICHAEL J. BURKE
BY Barthel & Bugbee
ATTORNEYS

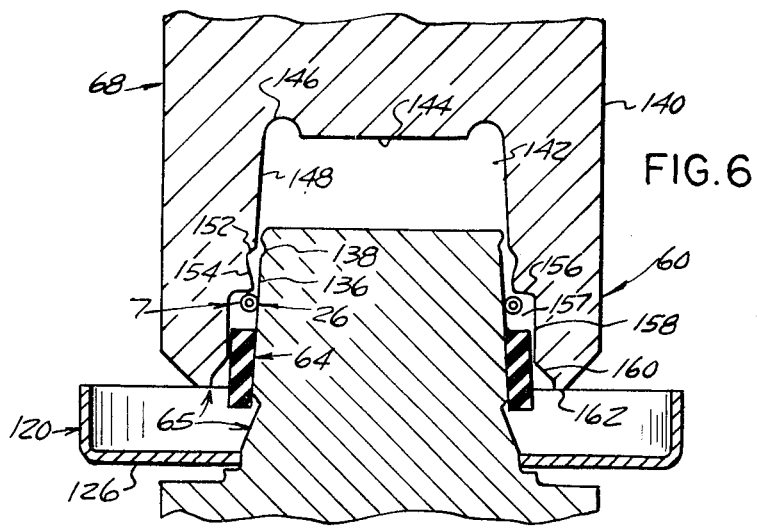
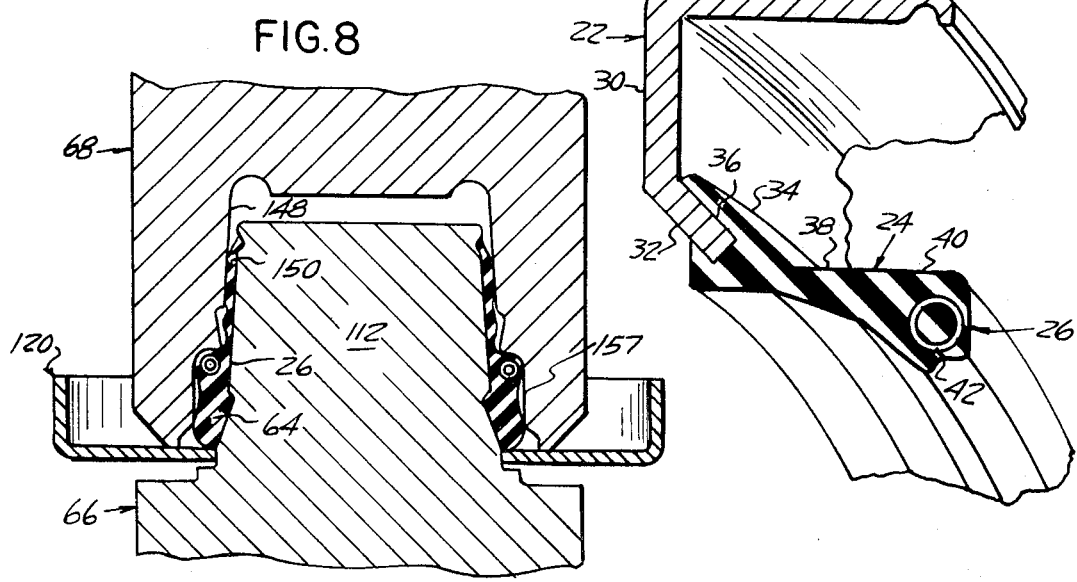
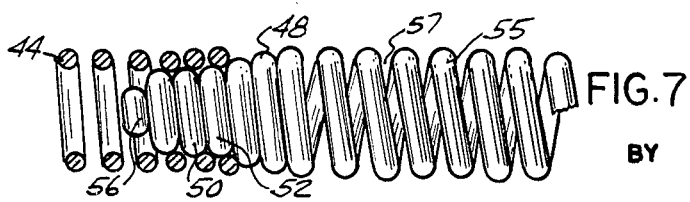
INVENTOR
MICHAEL J. BURKE
BY Barthel & Bugbee
ATTORNEYS

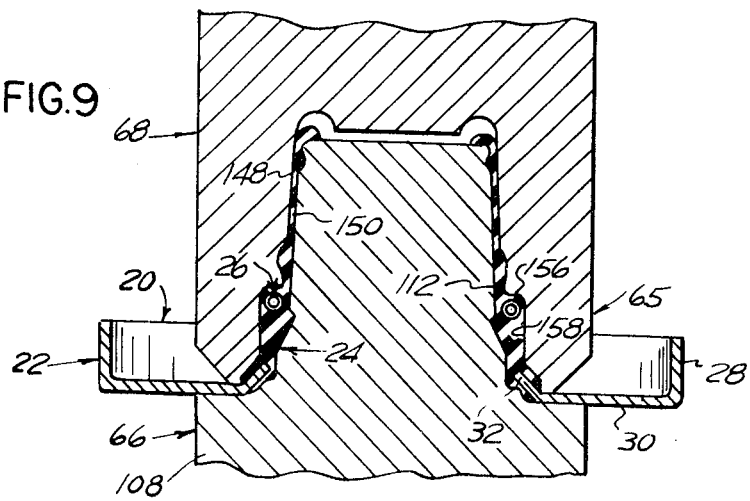
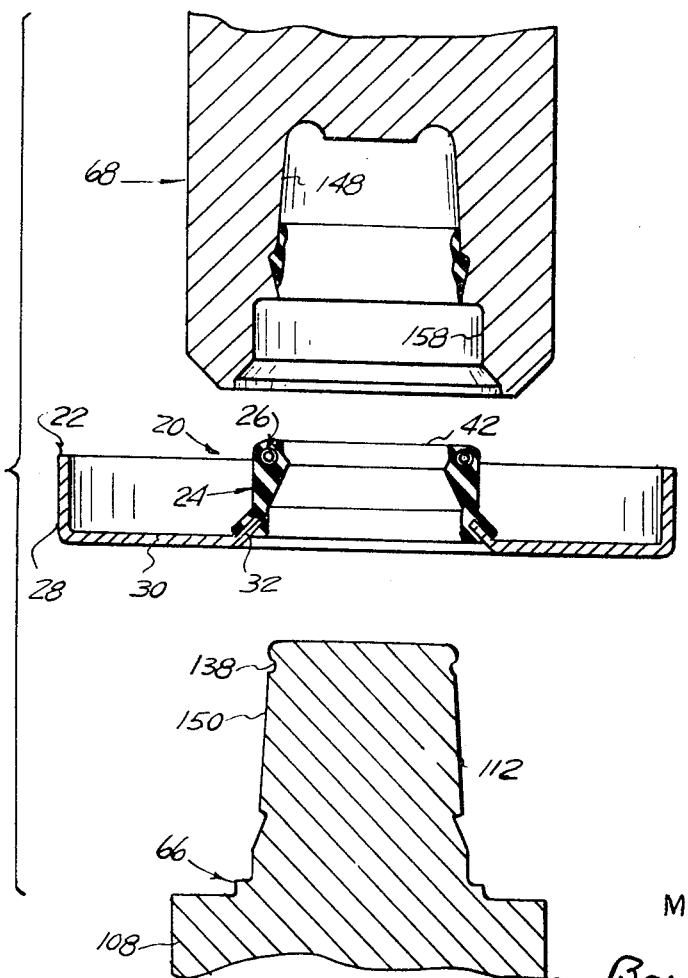

METHOD FOR MAKING AN ELASTOMERIC ANNULAR SEAL WITH ENCLOSED GARTER SPRING

BACKGROUND OF THE INVENTION

Prior annular seals, such as are used for shafts, have employed annular hollow tension springs known as garter springs, to maintain contact and pressure between the seal and the shaft. Originally, the spring was snapped into a groove around the exterior of the elastomeric collar performing the sealing action, but such springs not only became lost during transportation and storage but also became dislodged during use. Efforts to embed the spring in the elastomer of the seal during molding gave an uneven action by the uneven distribution of the elastomer because some of the elastomer was pushed into the hollow within the spring through the opening or "nib" where the opposite ends of the cut length of straight spring were joined to form the annular spring. Prior efforts to deliberately fill the hollow within the spring have also been unsuccessful, due to the inability to completely and uniformly fill the interior of the spring, thereby creating unequal forces therearound and causing uneven wear, leakage of lubricant and entry of foreign matter.

SUMMARY OF THE INVENTION

The method and apparatus of the present invention, by expanding the tightly-wound spring to open up its convolutions effect rapid and even flow of elastomer into the hollow of the spring, filling it uniformly and completely The ejection of the seal from the mold core member causes the convolutions of the spring to be pulled together by the force of the spring so as to squeeze out some of the elastomer and to narrow the gaps between the convolutions. The annular body of elastomer thus formed within the hollow of the spring not only excludes any other material from entering the spring but also provides an annular resilient member inside the spring which enhances the resilience of the spring itself.

In the drawings:

FIG. 1 is a perspective view, upon a reduced scale, of a shaft seal with enclosed garter spring, made according to the method of the present invention;

FIG. 2 is an enlarged vertical section taken along the line 2—2 in FIG. 1;

FIG. 3 is a vertical section through a molding apparatus, according to the invention, with the so-called "poppet" thereof in the starting position holding the garter spring and elastomeric "prep" above the lower mold half;

FIG. 4 is a view similar to FIG. 3, but with the prep and garter spring pushed downward onto the lower mold half or core;

FIG. 5 is an enlarged side elevation of a portion of the garter spring at the connection between its opposite ends, in its relaxed condition, looking in the direction of the arrow 5 in FIG. 4;

FIG. 6 is a view similar to FIGS. 3 and 4 but with the poppet removed and with the upper mold half or cavity mold component of the mold assembly lowered to its first position moving the spring and prep downward on the tapered core mold component;

FIG. 7 is a view similar to FIG. 5 but looking in the direction of the arrow 7 in FIG. 6, showing the same enlarged side elevation portion of the garter spring in its partially stretched condition;

FIG. 8 is a view similar to FIG. 6, but with the upper cavity mold component moved downward to its second position forming the prep into the approximate shape of the seal and embedding the garter spring therein;

FIG. 9 is a view similar to FIGS. 6 and 8 but showing the cavity mold lowered to its third position, completing the molding of the seal and bending the inner rim of the metal case into an embedded relationship with the seal; and FIG. 10 is an exploded central vertical section through the mold of FIGS. 6, 8 and 9, with the cavity mold component raised to its open position and with the completed seal ejected from both mold components.

Referring to the drawings in detail, FIGS. 1 and 2 show a radial shaft seal, generally designated 20, made according to the method and by the molding apparatus of the present invention and consisting of an annular metal mounting case 22 embedded in one end of an annular elastomeric seal or body member 24 which in turn contains a garter spring 26 embedded and substantially enclosed fully therein. The mounting case 22 which is rigid is preferably made of steel or other suitable material and is provided with a cylindrical outer portion 28, an annular radial portion 30 and an annular oblique or conical inner coupling portion 32 to which the rearward end portion 34 of the seal member 24 is bonded during molding within an annular groove 36 formed in the rearward end 34 during molding. The seal member 34, in addition to the rearward end portion 36, has an intermediate substantially axial annular flexing portion 38 which is generally thinner than the annular rearward end portion 36 but which may be thicker in a pressure seal. The flexing portion 38 is also thinner than the annular forward end portion or head 40 containing the garter spring 26. The forward portion or head 40 immediately adjacent the garter spring 26 has a sharp-edged sealing lip 42 which is urged against the shaft (not shown) to be sealed by the constricting action of the pre-tensioned garter spring 26.

The garter spring 26 is preferably of spring steel. It may also be of stainless steel but not necessarily so since when completely embedded in the head 40, it is thereby completely protected from corrosive substances which might otherwise cause deterioration of an ordinary steel spring. The garter spring 26 (FIG. 5) is made from a desired "cut length" of a close-wound straight helical tension spring (FIG. 5), the cut length of course depending upon the eventual major diameter of the garter spring 26. The coil diameter or minor diameter of the individual convolutions or coils 44 of the spring 26 terminate at a point 46 near one end thereof, and therebeyond are reduced in minor diameter for one or two convolutions 48 to a short length of three or four straight reduced-diameter convolutions 50. The latter are of the minor external diameter which is substantially the same as the minor internal diameter of the straight convolutions 44 of the spring 26 so as to fit tightly inside the latter when the two ends of the cut length of the spring are brought together to form the garter spring 26. The tapered convolutions 48 and the reduced diameter convolutions 50 together constitute the so-called nib 52 which serves as a nose to be thrust into the convolutions 44 at the opposite end 54 of the spring 26 to unite these ends into the annular garter spring 26. The nib 52 terminates in an undersized coil or convolution 56. When the spring 26 is expanded to open up gaps 57 between its coils or convolutions 44 (FIG. 7) during molding, the so-called cut length of the straight section of spring used to form the annular garter spring 26 is extended as the spring is expanded to form a so-called "working length" equal to the length of the straight portion 55 without including the nib 52 which is then, of course, inside the opposite non-tapered end.

It will be understood that the case 22 shown in the various figures of the drawings is but a single shape of which there are many variations, depending upon the particular installation for which it is designed and the particular configuration of the mounting in which it is to be held in its position surrounding the shaft to be sealed. It will also be understood that the seal 20 of the present invention will vary greatly in overall diameter as well as in the internal diameters of the sealing lips 42, such as surround the shafts of the rolls in metal rolling mills.

The molding apparatus, generally designated 60, shown in FIGS. 3, 4, 6, 8, 9 and 10 consists generally of three components, namely a first component which is a loading device, generally designated 58, including a so-called poppet 62, preferably of aluminum, which holds the garter spring 26 and the annular so-called "prep" or charge 64 of uncured elastomer from which the elastomeric portion or seal body or member 24 is formed. The second component is an inner male mold component or core 66 upon which the prep 64 and spring 26 are deposit from the poppet 62 at the start of the molding operation. The third component is an outer female or mold cavity component 68 which comes into operation after the spring 26 and prep 64 have been transferred from the poppet 62 to and upon the core 66 and which in cooperation with the core 66 performs the final molding and metal-forming operation. The cavity component 68 and the core component 66 collectively constitute a mold assembly, generally designated 65.

The poppet 62 of the molding apparatus 60 (FIGS. 3 and 4) is attached to and operated by a so-called poppet board 70. The poppet 62 has a central bore 72 extending through a lower generally cylindrical portion 74 and a flange portion 76 at the upper end thereof. The generally cylindrical portion 74 has a cylindrical external surface 78 provided with vertically-spaced upper and lower annular round-bottomed grooves 80 and 82 respectively. A bore 84 in the poppet board 70 fits around the cylindrical portion 74 of the poppet 62. Engaging the poppet board 70 and movable unitarily therewith is a feeding collar 86, both being slidable relatively to the poppet 62, as is shown by a comparison of FIGS. 3 and 4. The collar 86 is provided with a central bore 88 with a counterbore 90 around the groove 80 which in a mechanical press (but not in a hydraulic press) receives a tensioned annular detent spring 92. The collar 86 has an upper end 94 which engages the lower side 96 of the poppet board 70 and has a lower end 98 which engages the garter spring 26 on its downward stroke as described below. The poppet board 70 has an upper side 100 which at the upper limit of its stroke engages the annular shoulder 102 between the flange 76 and the cylindrical portion 74. The poppet 62 has a lower end 104 which, during operation, engages the upper end 106 of the lower mold component or punch 66.

The lower or inner male mold component or core 66 of the mold assembly 65 is provided with a base portion 108 adapted to be mounted on the bed of the press or other machine which operates the molding apparatus 60, and has a stepped portion 110 between it and forming portion 112 of the core 66 and terminates in an annular shoulder 114 above which is an annular toroidal groove or seat 116 adapted to receive and engage the inner periphery or central hole 118 of the case blank 120 from which the finished case 22 is formed by the method of this invention. An annular edge 122 between the upper shoulder 114 and the lower shoulder or surface 124 on the base portion 108 serves subsequently as an annular fulcrum (FIG. 9) in the final forming step of the method of this invention as described below. The case blank 120 is of an open-centered cup shape with a radial wall 126 containing the inner periphery or central hole 118 and also has an axial or cylindrical flange 128 at its outer periphery.

The forming portion 112 of the core 66 or inner male mold component has a short cylindrical side surface 130 (FIG. 3) immediately above the toroidal groove 116 for receiving the central hole 118 of the case blank 120. The cylindrical surface 130 terminates at its upper end in the lower end of a short conical surface 132 which at its upper end is connected by an annular groove 134 to the lower end of an elongated conical surface 136 of less taper than the conical surface 132. Near the upper end 106 of the core 112, the conical surface 136 terminates in an annular groove 138 configured to fit the garter spring 26.

The upper outer female or cavity mold component 68 of the mold assembly 65 (FIG. 6) is of generally cup-shaped form with a cylindrical outer surface 140 and has a generally conical cavity 142 with an end surface 144 surrounded by an annular relief groove 146 which merges into the upper end of the innermost convergent conical cavity surface 148. The latter is of substantially the same taper as the upper conical core surface 136 but is of slightly larger diameter so as to provide a tapered or frusto-conical clearance space 150 therebetween (FIG. 8) to receive any excess elastomer beyond that required to fill the mold chamber 157, as explained below.

Immediately below the lower end of the innermost conical cavity surface 148 is an annular shoulder 152 (FIG. 6) which separates it from the upper end of a divergent conical intermediate cavity surface 154, the lower end of which terminates in a shoulder 156 which connects it to the upper end of a short cylindrical surface 158 to form the mold chamber 157. The lower end of the cylindrical surface 158 in turn terminates at the upper end of an outermost convergent conical surface 160, the lower end of which terminates at an annular nose portion 162 which performs the bending of the radial portion 126 of the case blank 120 adjacent the central hole 118.

Conventional provision (not shown) is made for heating the molding apparatus 60 in order to cure the elastomer after molding has been completed and before ejection takes place. The temperatures involved are set forth below in connection with the description of the method.

In carrying out the method of the invention and in the operation of the molding apparatus 60, let it be assumed that the mold assembly 64 has been suitably heated, as explained below, and that the loading device 58 including the poppet 62 and poppet board 70 have been moved away from the male component or core 66. A case blank 120 is placed upon the core 66. A garter spring 26 is then pushed upward into the lower groove 82 and an uncured annular elastomeric body or "prep" 64 of natural or synthetic rubber is pushed onto the lower part of the cylindrical portion 74 of the poppet 62. The inner part of the case blank 120 adjacent the bore 118 is coated with a layer of bonding cement. The poppet 62 is then moved by means of the poppet board 70 into the position shown in FIG. 3 over the core 66 with the end surfaces 104 and 106 in engagement and in alignment with one another. The garter spring 26 at this stage of the operation is in a pretensioned tightly-coiled condition (FIG. 5) without gaps between its coils or convolutions 44.

The poppet board 70 is now moved downward, pushing ahead of it the collar 86 and detent spring 92. In so doing it moves the detent spring 92 out of the upper groove 80 and pushes the garter spring 26 likewise out of the lower groove 82, and then pushes the garter spring 26 and prep 64 downward upon the tapered surface 136 of the core 66 (FIG. 4) until the garter spring 26 enters the annular groove 138. The now empty poppet 62 is returned to its condition shown in FIG. 3 by moving the poppet board 70 and collar 86 upward so that the detent spring 92 moves out of the lower groove 82 and back into the upper groove 80 (FIG. 3).

The loading device 58 is now moved away from the punch 66 and the cavity mold component 68 of the mold assembly 65 brought into alignment therewith (FIG. 6) and moved downward, forcing the garter spring 26 downward out of the groove 138 and pushing the prep 64 ahead of the spring 26 downward substantially to the button of the conical surface 136. This action expands the spring 26 to open up gaps 57 between the convolutions 44 thereof (FIG. 7). The cavity mold component 68 continues to move downward (FIG. 8), stretching or expanding the garter spring 26 still further and widening the gaps 57 between its convolutions or coils 44, at the same time deforming the uncured elastomeric prep 64 into the shape of the chamber 157 and completely enclosing the expanded garter spring 26 in the now deformed prep 64 which has not, however, received its final shape. Surplus elastomer is ejected upward into the clearance space 150. Meanwhile, the elastomer of the prep or charge 64 is forced through the gaps 57 between the convolutions 44 of the garter spring 26 to completely fill the interior thereof.

The upper or cavity mold component 68 continues to move downward into the position shown in FIG. 9, causing the charge 64 to further deform and completely fill the mold chamber 157. At the same time, the annular nose portion 162 engages and pushes downward upon the inner part of the radial wall 126 of the case blank 120, cooperating with the annular edge 122 of the annular shoulder 114 acting as an annular fulcrum to bend the said inner part of the radial wall 126 upward to form the conical inner portion 32 of the case 22, which is now fully formed. At the same time, the downward motion of the upper mold component 68 has filled the space around the conical portion 32 with elastomer from the charge 64, bonding these to one another within the annular groove 36, thereby formed in the rearward end portion 34 of the sealing member 24. While this action is taking place, excess elastomer continues to be ejected through the clearance space 150 as the latter becomes narrower in width and closes up, cutting off most or all of any flash formed at its lower end.

The upper and lower mold components 68 and 66 of the mold assembly 65 are then held motionless for a period of approximately 2 to 5 minutes at a temperature range of approximately 325° F. to 425° F. to cure the seal member or body 24. The upper or cavity mold component 68 is then moved upward into its retracted position (FIG. 10) away from the core component 66 and the now completed seal 20 is ejected from the lower mold component 66 by means of a conventional so-called "stripper" (not shown). Any flash remaining at the free end of the sealing member 24 is then removed, leaving the sharp-edged sealing lip 42 thereat. In the method of the present invention and with the apparatus therefor, however, it is found that very little flash remains and that such trimming is frequently unnecessary.

Since the garter spring is fully enclosed by the elastomer, it cannot be dislodged and lost or thrown into the machinery with consequent damage thereto. For the same reason, the seal can be used in a corrosive atmosphere, liquid or substance and an ordinary steel spring can be used in place of the expensive stainless steel spring required where the spring is exposed. The garter spring is a pre-tensioned spring so that in its relaxed condition the convolutions are tightly wound. Any suitable elastomer may be employed, depending upon the conditions of use. Ordinary rubber may be used where the seal is to prevent leakage of water. Nitrile silicones are also suitable, likewise the commercially available synthetic rubber.

I claim:

1. A method of molding and bonding to an annular mounting case an elastomeric annular seal while enclosing an annular hollow tightly-wound pre-tensioned helical tension spring therein and completely and uniformly filling the hollow surrounded by the convolutions thereof with elastomeric material, said method comprising positioning an annular mounting case at the bottom of an annular mold chamber having an enlarged upper portion adapted to mold an annular enlarged head on the seal and with the case having a coupling portion extending into the mold chamber, positioning a pre-tensioned tightly-wound annular hollow helical tension spring at the top of the mold chamber, simultaneously charging the mold chamber with a charge of elastomeric material sufficient to enclose the spring therein and to completely fill the hollow within the spring while expanding the annular hollow helical tension spring to space the convolutions thereof apart from one another and at the same time completely and uniformly filling the hollow within the spring through the thus-formed spaces between the convolutions thereof while enclosing the spring within the elastomeric material throughout the length of said spring, effecting solidification of the elastomeric material while bonding the elastomeric material at the bottom of the molding chamber to the coupling portion, terminating the expanding of the now enclosed and uniformly filled hollow helical tension spring, and removing the thus-formed seal from the mold chamber.

* * * * *